US012714632B2

(12) United States Patent
Ben-Noon

(10) Patent No.: US 12,714,632 B2
(45) Date of Patent: Aug. 25, 2026

(54) ADJUSTABLE COMPRESSION SLEEVE FOR AMPUTATED SUBJECTS AND METHODS OF USING THE SAME

(71) Applicant: MEGO AFEK AC LTD., Kibbutz Afek (IL)

(72) Inventor: Asher Ben-Noon, Kibbutz Afek (IL)

(73) Assignee: MEGO AFEK AC LTD., Kibbutz Afek (IL)

( * ) Notice: Subject to any disclaimer, the term of this patent is extended or adjusted under 35 U.S.C. 154(b) by 572 days.

(21) Appl. No.: 18/266,670

(22) PCT Filed: Dec. 15, 2021

(86) PCT No.: PCT/IL2021/051493
§ 371 (c)(1),
(2) Date: Jun. 12, 2023

(87) PCT Pub. No.: WO2022/130382
PCT Pub. Date: Jun. 23, 2022

(65) Prior Publication Data

US 2024/0041693 A1 Feb. 8, 2024

Related U.S. Application Data

(60) Provisional application No. 63/126,610, filed on Dec. 17, 2020.

(51) Int. Cl.
*A61H 9/00* (2006.01)

(52) U.S. Cl.
CPC ......... *A61H 9/0092* (2013.01); *A61H 9/0007* (2013.01); *A61H 2201/0192* (2013.01); *A61H 2201/1652* (2013.01); *A61H 2201/5056* (2013.01); *A61H 2205/10* (2013.01)

(58) Field of Classification Search
CPC ................ A61H 9/0007; A61H 9/0092; A61H 2201/0103; A61H 2201/0192; A61H 2201/164; A61H 2201/1642; A61H 2201/1647; A61H 2201/5056; A61H 2205/10; A62F 2/78; A62F 2/7843; A62F 2002/7862; A62F 2002/7881;
(Continued)

(56) References Cited

U.S. PATENT DOCUMENTS 3,889,301 A 6/1975 Bonner, Sr.
3,920,006 A * 11/1975 Lapidus ............... A61H 9/0078 604/23

(Continued)

OTHER PUBLICATIONS

PCT International Search Report for International Application No. PCT/IL2021/051493, mailed Mar. 27, 2022, 3pp.

(Continued)

*Primary Examiner* — Douglas Y Sul
(74) *Attorney, Agent, or Firm* — The Roy Gross Law Firm, LLC; Roy D. Gross

(57) ABSTRACT

Provided herein is an inflatable compression device for performing compression therapy to an amputated limb of a subject, the device includes a compression sleeve and an adjustable compression pocket configured to provide compression therapy to the stump face and adjust to the length of the amputated limb. Further provided are systems and methods of using the same.

19 Claims, 7 Drawing Sheets

(58) Field of Classification Search
CPC .............. A62F 2002/7893; A62F 5/012; A62F 5/05816; A62F 13/061; A62F 13/062
See application file for complete search history.

(56) References Cited

U.S. PATENT DOCUMENTS

| | | | | |
|---|---|---|---|---|
| 4,773,397 | A * | 9/1988 | Wright | A61H 9/0078 601/151 |
| 5,108,456 | A | 4/1992 | Coonan, III | |
| 6,368,357 | B1 | 4/2002 | Schon et al. | |
| 9,155,636 | B1 * | 10/2015 | Fikes | A61F 2/7812 |
| 2004/0030411 | A1 * | 2/2004 | Caspers | A61H 9/0078 623/36 |
| 2005/0256556 | A1 * | 11/2005 | Schirrmacher | A61F 7/02 607/104 |
| 2006/0004315 | A1 * | 1/2006 | Bort | A61F 13/062 602/61 |
| 2006/0173553 | A1 * | 8/2006 | Holzer | A61F 2/602 623/32 |
| 2013/0012847 | A1 * | 1/2013 | Lowe | A61H 9/0092 601/18 |
| 2016/0008178 | A1 * | 1/2016 | Babic | A61F 13/085 602/62 |
| 2016/0235612 | A1 * | 8/2016 | Ky | A61H 7/001 |
| 2018/0185175 | A1 * | 7/2018 | Whiteside | A61F 2/78 |

OTHER PUBLICATIONS

PCT Written Opinion for International Application No. PCT/IL2021/051493, mailed Mar. 27, 2022, 7pp.

PCT International Preliminary Report on Patentability for International Application No. PCT/IL2021/051493, issued Jun. 13, 2023, 8pp.

* cited by examiner

ADJUSTABLE COMPRESSION SLEEVE FOR AMPUTATED SUBJECTS AND METHODS OF USING THE SAME

CROSS REFERENCE TO RELATED APPLICATIONS

This application is a National Phase of PCT Patent Application No. PCT/IL2021/051493 having International filing date of Dec. 15, 2021, which claims the benefit of priority of U.S. Provisional Patent Application No. 63/126,610, filed Dec. 17, 2020, the contents of which are all incorporated herein by reference in their entirety.

FIELD OF THE INVENTION

The invention, in some embodiments thereof, relates to system, device and method for providing compression therapy to amputated subjects, utilizing an adjustable compression sleeve.

BACKGROUND

Compression therapy is used to apply controlled pressure to body parts, for example, to improve blood flow, prevent or reduce blood clots formation, and the like. Compression therapy may be applied, for example, by a bandage fitted on or around the body part (such as a limb) subjected to the compression therapy. Other type of compression therapy utilizes pneumatic compression therapy. This form of treatment is performed using a compression device, which feeds compressed air to a garment or sleeve containing one or more cells which inflate and deflate, alternately applying and releasing pressure to the extremities of the patient.

Providing compression therapy to amputated limb is a cumbersome action, as it requires customizing the compression device to the specific amputation (size, length, location, etc.). Furthermore, it does not allow providing the therapy under various conditions, such as, standing or walking.

There remains a need in the art for adjustable inflatable compression devices capable of providing effective compression therapy to amputated subjects, while being adjustable to a varied range of lengths of amputated limbs and while allowing the subject to utilize the device under various circumstances.

SUMMARY

Aspects of the invention, in some embodiments thereof, relate to systems, devices and methods for providing compression therapy to an amputated limb of a subject. According to some embodiments, there are provided advantageous inflatable compression devices, for example, in the form of inflatable compression sleeve and an associated adjustable compression pocket, capable of providing efficient pneumatic compression therapy to an amputated limb of a subject, wherein the compression device is adjustable to a range of lengths of amputated limbs. In some embodiments, the inflatable compression device includes a compression sleeve having one or more inflatable bladders (chambers), configured to be surroundingly engageable around the amputated limb (in particular on the circumference of the limb) and an associated adjustable inflatable pocket (cell) which is configured to adjust in height/length and to engage the face of the stump, to provide compression therapy thereto. In some embodiments, the device may further include a harness configured to secure and adjust the device to the body of the subject. According to some embodiments, further provided herein are systems utilizing the compression device and methods of using the same to provide an optimized and personalized compression therapy to the amputated limb, and which can be used under various conditions, including, for example, standing or walking (for example, using crutches).

According to some embodiments, the compression device disclosed herein is advantageous, as it allows providing an adjusted, customized and localized compression therapy to a wide range of lengths of amputated limbs. By utilizing the advantageous adjustable compression pocket, the length/height of which can be accurately and safely adjusted to the specific length of the amputate limb to be treated. Furthermore, the advantageous compression device allows the use thereof under various conditions, including, for example, while standing or walking (for example, by the aid of crutches). Thus, the advantageous compression device disclosed herein can provide both circumferential compression therapy to the amputated limb as well as compression therapy to the face of the stump, in a most accurate and personalized manner, which results in enhanced treatment efficiency and efficacy. Additionally, the device is highly cost effective, as it can be adjusted to a verity of subjects, and need not be custom made for each treated amputated subject.

According to some embodiments, the advantageous adjustable inflatable compression device disclosed herein is configured for use in pneumatic compression therapy on amputated limbs, to, for example, but not limited to: enhance blood circulation, reduce lymphatic fluid accumulation in the amputated limb, reduce post surgical edema, control post surgical edema, reduce pain, enhance wound healing, control chronic lymphedema, and the like, or any combination thereof.

According to some embodiments, there is provided an inflatable compression device for providing compression therapy to an amputated limb of a subject, the compression device includes a compression sleeve configured to be surroundingly engageable with the amputated limb and an adjustable compression pocket configured to be in contact (directly or indirectly) with the stump face of the amputated limb, to thereby provide compression therapy to the stump face and at least a portion of the limb.

According to some embodiments, the adjustable compression pocket is retractable, collapsible or foldable. According to some embodiments, the adjustable compression pocket is in the form of bellow, configured to be inflated or deflated.

According to some embodiments, the height/length of the adjustable compression pocket is configured to be adjustable. According to some embodiments, the height or length of the adjustable compression sleeve can vary in the range of about 1-20 cm (for example, 3-8 cm, 12-20 cm). According to some embodiments, the height or length of the adjustable compression pocket is adjusted by introduction of fluid, such as air, into the pocket.

According to some embodiments, the adjustable compression pocket includes an opening (ventilation opening), configured to allow fluid passage to and from the pocket.

According to some embodiments, the adjustable compression pocket is fluidly sealed.

According to some embodiments, at least some portions of the wall of the adjustable compression pocket are welded thereto.

According to some embodiments, the adjustable pocket includes an external cover, having one or more fastening means configured to allow control over of the degree of height or length adjustment of the compression pocket. According to some embodiments, the fastening means include straps, Velcro, buttons, pins, Zipper, or any combination thereof.

According to some embodiments, the compression sleeve may include one or more bladders configured to be inflated and deflated to thereby provide compression therapy to at least a portion of the limb, in particular, the circumference of the limb.

According to some embodiments, the one or more bladders comprise opening (ventilation opening) configured to allow fluid passage to and from the pocket.

According to some embodiments, the adjustable compression pocket is functionally and/or physically associated with the compression sleeve.

According to some embodiments, the adjustable compression pocket is reversibly attached to the compression sleeve. According to some embodiments, the adjustable compression pocket is reversibly attached to the compression sleeve by means of: zipper, straps, Velcro, buttons, pins, or combinations thereof.

According to some embodiments, the adjustable compression pocket is integrally formed with the compression sleeve.

According to some embodiments, the adjustable compression pocket is substantially located horizontally relative to the compression sleeve, such that the adjustable pocket is engaged or in contact with the stump face and the sleeve is engaged or in contact with circumference portion of the limb.

According to some embodiments, the inflatable compression device further includes a harness configured to engage a body part of the subject to attach or secure the compression sleeve and/or the compression pocket to the amputated limb.

According to some embodiments, the harness is adjustable to conform to the body part of the subject (such as, stomach, shoulder, etc.).

According to some embodiments, the harness is reversibly associated with the compression sleeve. According to some embodiments, the harness may be attached to the compression sleeve by means such as, straps, Velcro, zipper, pins, buttons, hooks and loops, flaps, and the like, or combinations thereof.

According to some embodiments, the pressure in the adjustable compression pocket and or the one or more bladders of the compression sleeve are configured to be in the range of about 15-120 mmHg.

According to some embodiments, walls of the one or more bladders and/or the walls of the adjustable inflatable pocket may be made of sheets of PE, EVA, PVC and/or TPU.

According to some embodiments, the compression device may be used for enhancing blood circulation, reducing lymphatic fluid accumulation in the amputated limb, reducing and controlling post surgical edema, reduce pain, enhance wound healing, control chronic lymphedema, or any combination thereof.

According to some embodiments, the adjustable device may further include an external cover (for example, in the form of a garment made of fabric).

According to some embodiments, there is provided system for providing compression therapy to an amputated limb of a subject, the system includes:

- the inflatable compression device as disclosed herein, and a controller unit configured to control the operation of inflatable compression device.

According to some embodiments, the system may further include a fluid compressor configured to inflate or deflate the compression sleeve (in particular, bladders thereof) and/or the adjustable compression pocket.

According to some embodiments, the system may further include one or more valves, configured to control pressure in bladders of the compression device. In some embodiments, the valves are electric valves, such as, electric solenoid valves.

In some embodiments, the system may further include a user interface. According to some embodiments, the user interface may include one or more of: keyboard, display, tracking device, touch screen, or any combination thereof.

According to some embodiments, the controller device may further include a communication unit. According to some embodiments, the communication unit may include wired and/or wireless communication modalities. In some embodiments, the communication unit may include Bluetooth communication modality, Wi-Fi communication modality, Near field communication modality (NFC), ethernet, USB, HDMI, or combinations and/or a communication unit.

According to some embodiments, the system is configured to inflate, deflate, or maintain pressure in the compression sleeve and/or adjustable compression pocket, in accordance with the compression therapy session.

According to some embodiments, the system is configured to adjust the compression device to the length of the amputated limb.

According to some embodiments, one or more bladders of the compression sleeve and/or the adjustable compression pocket are configured to inflate and/or delate in synchronization, concomitantly or sequentially.

According to some embodiments, there is provided a method for providing a compression therapy to an amputated limb of a subject in need thereof, the method includes one or more of the steps of:

- placing an adjustable compression device as disclosed herein, on the subject, such that the compression sleeve is engageable with at least a portion of the limb (circumference thereof);
- adjusting the height or length of the adjustable compression pocket to conform to the length of the amputated limb, such that the compression pocket is least partially in contact with the face of the stump; and
- controlling the pressure in the inflatable compression device to provide a suitable compression therapy to the amputated limb.

According to some embodiments, controlling the pressure in the inflatable compression device includes reducing, maintaining, or increasing the pressure in one or more bladders of the compression sleeve and/or the in the adjustable compression pocket.

According to some embodiments, adjusting the height or length of the adjustable compression pocket is facilitated by introduction of fluid into the pocket.

According to some embodiments, the fluid is air.

According to some embodiments, controlling the pressure is facilitated using a control unit.

According to some embodiments, the method may further include fastening or securing the compression device to the subject, such that it is adjusted to the length of the amputated limb.

Certain embodiments of the present invention may include some, all, or none of the above advantages. Further advantages may be readily apparent to those skilled in the art from the figures, descriptions, and claims included herein.

Aspects and embodiments of the invention are further described in the specification hereinbelow and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures:

FIG. 1B—a perspective close up view of a compression sleeve and adjustable compression pocket of a compression device, according to some embodiments;

FIG. 3B—a perspective front view of portions of a compression device placed on an amputated limb having a relatively short stump, according to some embodiments;

FIG. 4B—a perspective view of a compression device placed on a relatively shorter amputated limb, according to some embodiments.

DETAILED DESCRIPTION

Figure 1A:
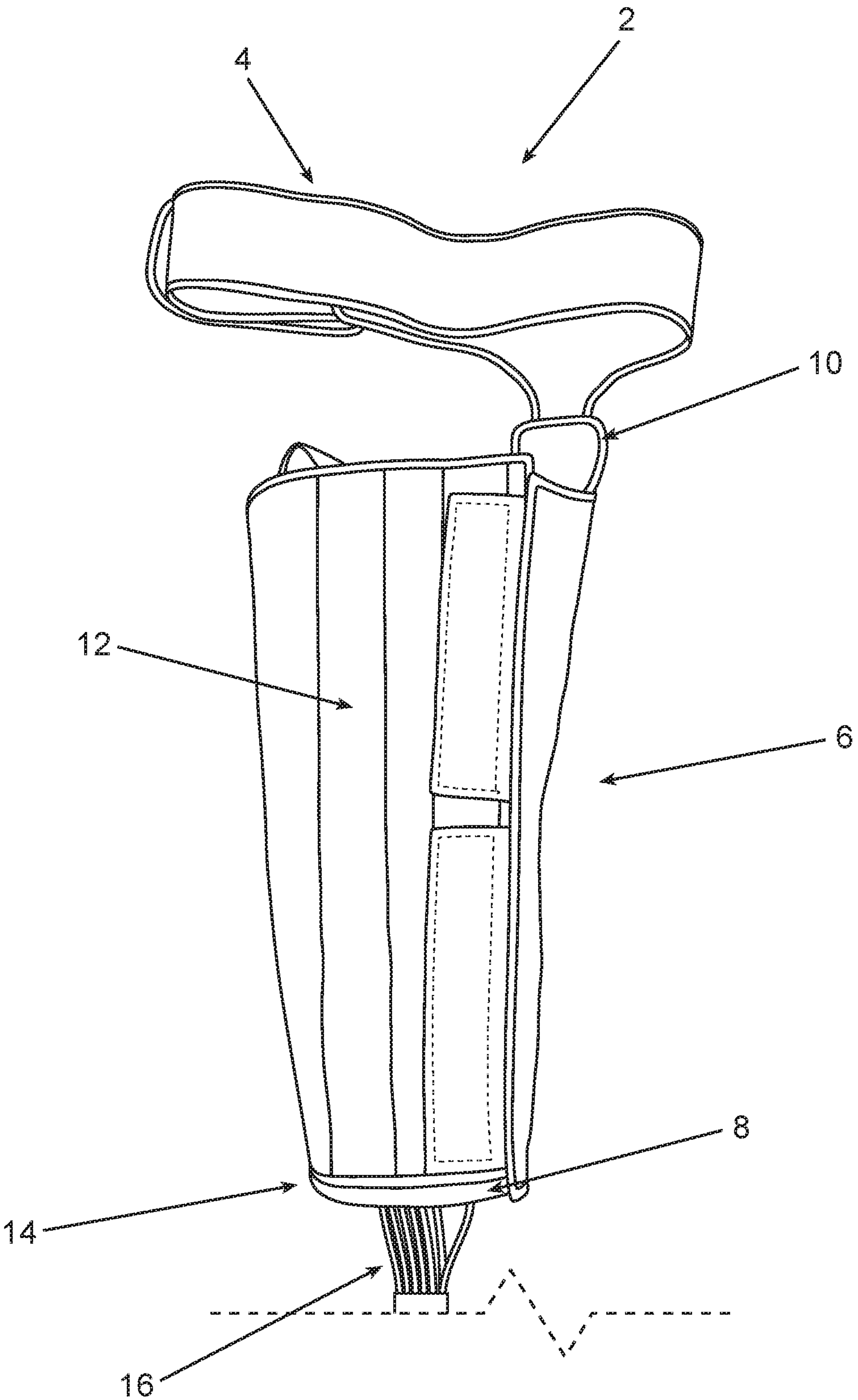
FIG. 1A—a perspective view of a compression device, according to some embodiments.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, each of the words "comprise" "include" and "have", and forms thereof, are not necessarily limited to members in a list with which the words may be associated.

As used herein, "right" and "left" refer to the right and left directions from the center of body of a subject. In some embodiments, left and right are determined by the sagittal plane (longitudinal, anteroposterior), which is parallel to the sagittal suture. In some embodiments, the terms "left" and "left hand side" may interchangeably be used. In some embodiments, the terms "right" and "right hand side" may interchangeably be used.

As used herein, the terms "top" and "bottom" refer to top and bottom directions of a subject body. In some embodiments, "top" is relatively closer to the head region and "lower" is relatively closer to the leg region. In some embodiments, top and bottom are relative to the transverse plane (axial or horizontal plane), which divides the body into cranial and caudal (head and tail) portions. In some embodiments, a compression device is placed on the body of the subject, such that the sleeve is at least partially soundingly engageable with the circumference of the limb and the adjustable compression pocket is configured to engage the face of the stump.

As used herein, the terms "bladder", "inflatable bladder", "compartment", and "chamber" "cell", may interchangeably be used. The terms relate to a cell capable of being inflated, deflated, or maintain fluid therein. In some embodiments, the bladders disclosed herein may be linearly arranged in a compression sleeve. The bladders may be separate from one another or may have some overlap therebetween. In some embodiments, the bladders are at least partially fluidly connected thereto.

As used herein, the terms "pocket", "adjustable compression pocket", "adjustable pocket", "adjustable cell", "adjustable compression cell" may interchangeably be used. The terms relate to a cell capable of being inflated, deflated, or maintain fluid therein. In some embodiments, the pocket has foldable walls. In some embodiments, the pocket is collapsible, retractable, foldable, or the like, such that the height/length thereof may be adjusted. In some embodiments, the pocket is in the form of a bellow (also referred to as "Accordion" or "Garmoshka" forms), which is a collapsible chamber (flexible bag) whose volume can be changed by, for example, compression or expansion.

As used herein, the term "subject" and "patient" may interchangeably be used. The term relates to a subject having an amputated limb. In some embodiment, the limb may be a leg. In some embodiments, the limb maybe an arm. The amputation location/position along the limb is the stump region. In some embodiments, the location/position of the amputation, affects the length of the amputated limb. For example, in an amputated leg, the amputation location may be below or above the knee. In some embodiments, the amputated limb length is determined as the distance (length) between the face of the sump and an opposing end of the limb (for example, hup, shoulder, etc.). In some embodiments, the amputation may be related to a disease (such as, cancer, diabetes), an accident or an injury.

As used herein, the term "treating" relates to application of compression therapy to an amputated subject in need thereof. In some embodiments, the compression therapy is a pneumatic compression therapy. In some embodiments, the compression therapy includes a session of therapy, in the length of about 1-60 minutes, whereby continuous or intermittent pressure is applied amputated limb (circumference and/or stump thereof). In some embodiments, the treatment can at least partially ameliorate one or more symptoms associated with or related to the amputation, including, for example, but not limited to: enhancing blood circulation, reducing lymphatic fluid accumulation in the amputated limb, reducing and controlling post-surgical edema, reduce pain, enhance wound healing, control chronic lymphedema, or any combination thereof. In some embodiments, the treatment may be performed, for example, while the subject is standing, sitting or walking.

As used herein, the term "health care provider", "user", "physician" relate to a provider of therapy to a subject in need thereof.

As used herein, the term "about" is used to specify a value of a quantity or parameter (e.g. the length of an element) to within a continuous range of values in the neighborhood of (and including) a given (stated) value. According to some embodiments, "about" specifies the value of a parameter to be between 80% and 120% of the given value. For example, the statement "the length of the element is equal to about 1 m" is equivalent to the statement "the length of the element is between 0.8 m and 1.2 m". According to some embodiments, "about" specifies the value of a parameter to be between 90% and 110% of the given value. According to some embodiments, "about" specifies the value of a parameter to be between 95% and 105% of the given value.

According to some embodiments, there is provided an advantageous adjustable compression device, having a compression sleeve which includes one or more inflatable bladders configured to provide compression therapy to circumference of an amputated limb, with which they are engaged, and an advantageous adjustable compression pocket, in the form of a below, configured to adjust in height/length to the length/size of the amputated limb, such that it is engaged with the stump face, to provide compression therapy thereto.

Reference is now made to FIG. 1A, which shows a perspective view of a compression device, according to some embodiments. As shown in FIG. 1A, compression device 2 is generally shaped to conform to an amputated limb of a subject. The device shown in FIG. 1A is adjusted for example, to an amputated leg. The device includes harness 4, configured to secure or place the device on a body part of the subject (such as, waist). The harness is adjustable to conform to various body sizes. The harness 4 further includes fastening means 10 configured to attach/connect to compression sleeve 6. Compression sleeve 6 includes one or more inflatable bladders (not shown) and is configured to be placed on or around the amputated limb, in particular, around the circumference thereof. The sleeve may include an external cover (for example, in the form of any type of fabric) and may include fastening means 12 (for example, in the form of straps or Velcro) to allow adjusting and securing the sleeve on or around the limb. The device further includes an adjustable compression pocket 8, which is associated with the compression sleeve and is configured to engage the stump of the amputated limb. The compression pocket is configured to adjust in length/height (by having fluid inserted or compressed thereof, as detailed herein), to ultimately conform to the length of the amputated limb. The pocket 8 shown in FIG. 1A is in complete folded mode, prior to being placed on the subject limb. The pocket 8 may be at least partially attached to the sleeve 6 by fastening or securing means, shown in FIG. 1A as zipper 14. The pocket may be substantially perpendicular to the sleeve. In some embodiments the pocket may be interchangeable. Further shown in FIG. 1A are fluid lines (tubes) 16 which are configured to provide/remove fluid (such as air), to the bladders of the sleeve and/or the adjustable pocket, to thereby inflate or deflate the bladders and/or pocket. The deflation/inflation of the bladders provides compression therapy to the circumference of the amputated limb, with which the sleeve is engaged. The inflation of the pocket allows adjusting the height/length of the pocket to the length of the amputated limb, allows the engagement of the pocket with the face of the stump and further allow providing compression therapy to the stump. The external layer of the sleeve, harness, pocket and/or any other portions of the device may be made of any suitable material, including, for example, but not limited to: any type of fabric (woven or non-woven), plastic, nylon, rubber, and the like, or any combination thereof. In some embodiments, the device may be made or constructed or fabricated as one continuous element.

Figure 1B:
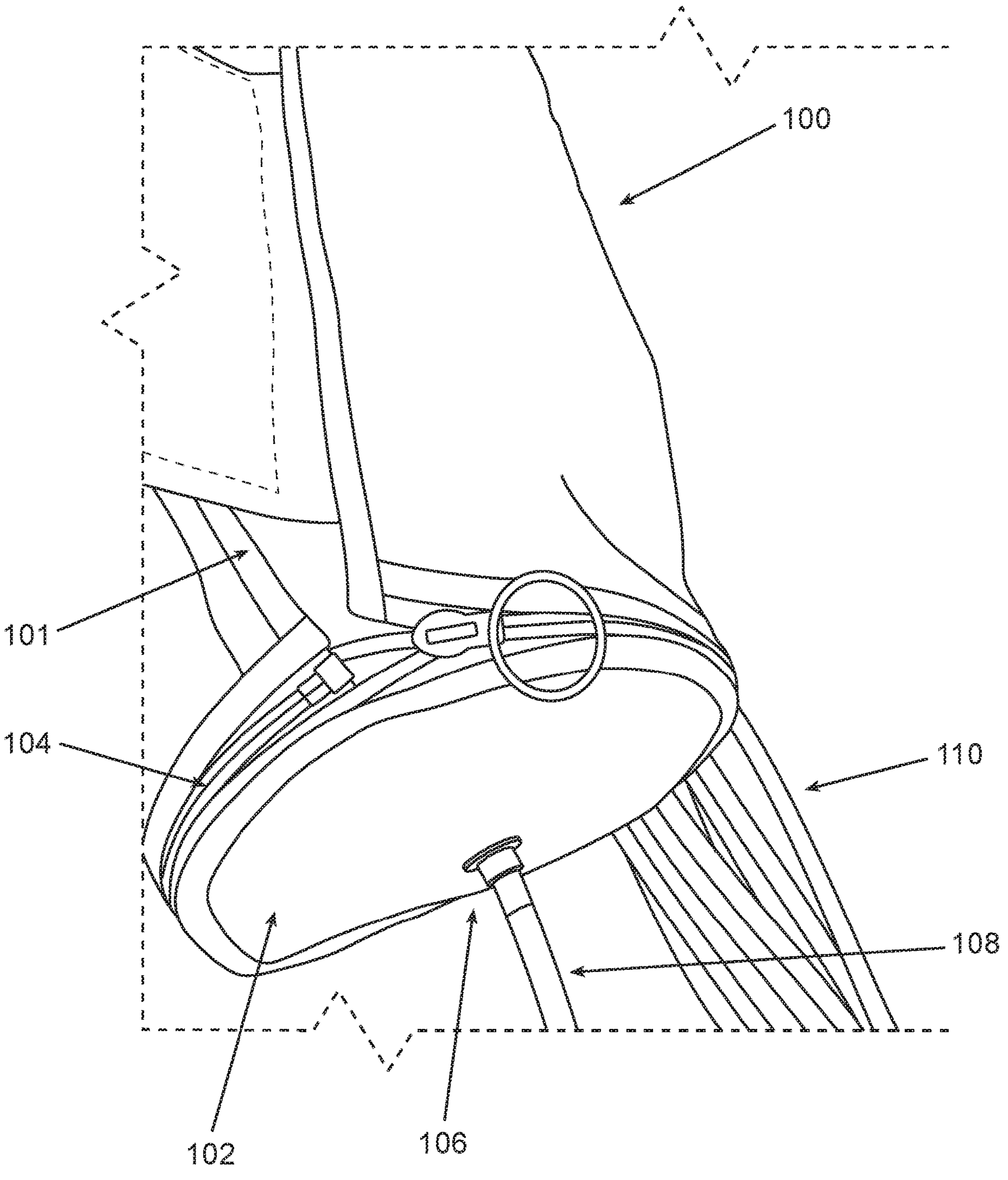

Reference is now made to FIG. 1B, which shows a perspective close up view of a compression sleeve and adjustable compression pocket of a compression device, according to some embodiments. As shown in FIG. 1B, compression sleeve 100 is configured to be placed on or around the amputated limb, in particular, around the circumference thereof. The sleeve may include an external cover (for example, in the form of any type of fabric) and may include fastening means 101 (for example, in the form of straps or Velcro) to allow adjusting and securing the sleeve on or around the limb. Further shown is adjustable compression pocket 102, which is associated with the compression sleeve 100, and is configured to engage the stump of the amputated limb. The compression pocket is configured to adjust in length/height (by having fluid inserted or compressed thereof, as detailed herein), to ultimately conform to the length of the amputated limb. The pocket 102 shown in FIG. 1B is in complete folded/collapsible mode. The pocket 102 may be at least partially attached to the sleeve 100 by fastening or securing means, shown in FIG. 1B as zipper 104. The pocket may be substantially perpendicular to the sleeve. In some embodiments the pocket may be interchangeable. Further shown in FIG. 1B is fluid opening 106 of pocket 102, which is configured to allow inflating/deflating of the pocket by allowing fluid in or out of the pocket, for example, via fluid line 108. Further shown are fluid lines (tubes) 110 which are configured to provide/remove fluid (such as air), to the bladders of the sleeve and/or to thereby inflate or deflate the bladders. The deflation/inflation of the bladders provides compression therapy to the circumference of the amputated limb, with which the sleeve is engaged. The inflation of the pocket allows adjusting the height/length of the pocket to the length of the amputated limb, allows the engagement of the pocket with the face of the stump and further allow providing compression therapy to the stump. The external layer of the sleeve, and/or pocket may be made of any suitable material, including, for example, but not limited to: any type of fabric (woven or non-woven), plastic, nylon, rubber, and the like, or any combination thereof. In some embodiments, the device may be made or constructed or fabricated as one continuous element.

Figure 2B:
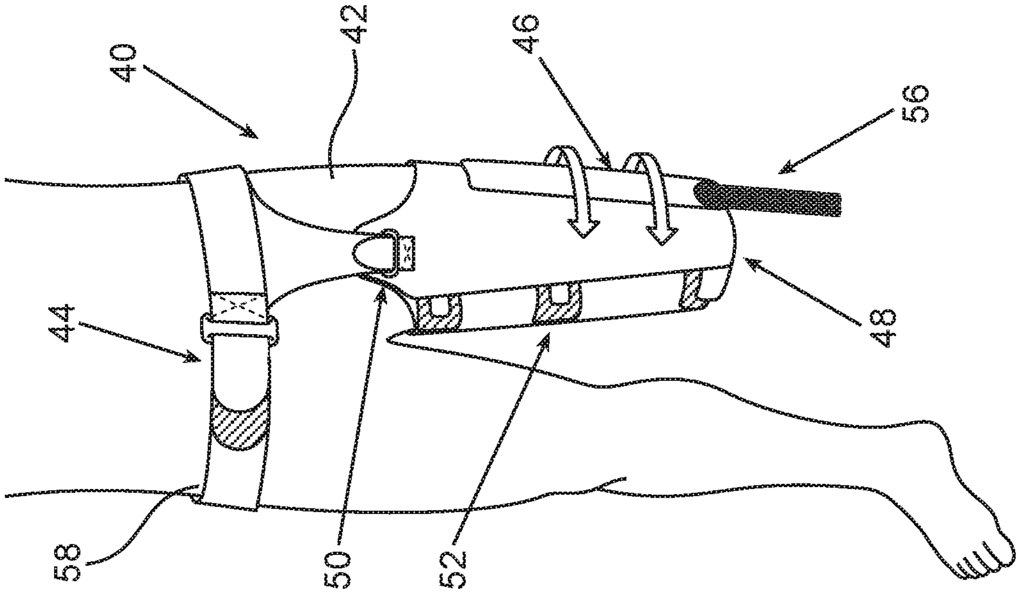
FIGS. 2A-2B—schematic front view illustrations of compression device placed on amputated limb (right leg, FIG. 2A and left leg, FIG. 2B), according to some embodiments.
Figure 2A:
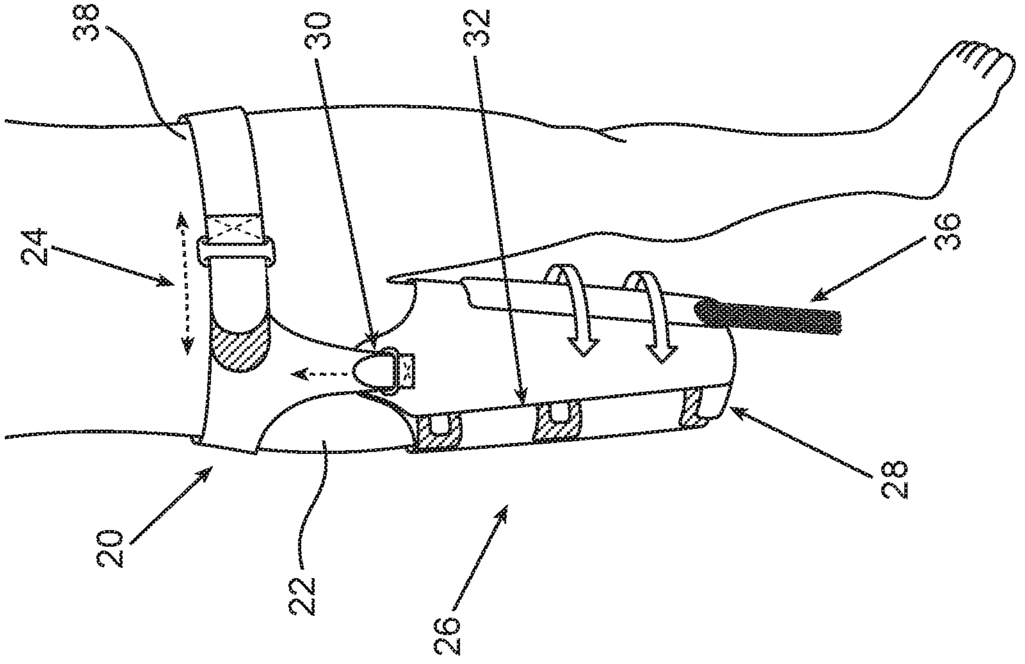

Reference is now made to FIGS. 2A-B, which shows a schematic front view illustrations of compression device placed on amputated limb (right leg, FIG. 2A and left leg, FIG. 2B), according to some embodiments. As shown in FIG. 2A, device 20 includes harness 24, configured to secure or place the device on a body part of the subject (such as, waist 38). The harness is adjustable to conform to various body sizes. The harness 24 further includes fastening means 30 configured to attach/connect to compression sleeve 26. Compression sleeve 6 includes one or more inflatable bladders (not shown) and is configured to be placed on or around the amputated right leg 22, in particular, around the circumference thereof. The sleeve may include an external cover (for example, in the form of any type of fabric) and may include fastening means 32 (for example, in the form of straps or Velcro™) to allow adjusting and securing the sleeve on or around the limb. The device further includes an adjustable compression pocket 28, which is associated with the compression sleeve and is configured to engage the stump of the amputated limb. The compression pocket is configured to adjust in length/height (by having fluid inserted or compressed thereof, as detailed herein), to ultimately conform to the length of the amputated limb. Further shown in FIG. 2A are fluid lines (tubes) 36 which are configured to provide/remove fluid (such as air), to the bladders of the sleeve and/or the adjustable pocket, to thereby inflate or deflate the bladders and/or pocket. The deflation/inflation of the bladders provides compression therapy to the circumference of the amputated limb, with which the sleeve is engaged. The inflation of the pocket allows adjusting the height/length of the pocket to the length of the amputated limb, and allows the engagement of the pocket with the face of the stump and further allow providing compression therapy to the stump.

As shown in FIG. 2B, device 40 includes harness 44, configured to secure or place the device on a body part of the subject (such as, waist 58). The harness is adjustable to conform to various body sizes. The harness 44 further includes fastening means 50 configured to attach/connect to compression sleeve 46. Compression sleeve 46 includes one or more inflatable bladders (not shown) and is configured to be placed on or around the amputated left leg 42, in particular, around the circumference thereof. The sleeve may include an external cover (for example, in the form of any type of fabric) and may include fastening means 52 (for example, in the form of straps or Velcro) to allow adjusting and securing the sleeve on or around the limb. The device further includes an adjustable compression pocket 48, which is associated with the compression sleeve and is configured to engage the stump of the amputated limb. The compression pocket is configured to adjust in length/height (by having fluid inserted or compressed thereof, as detailed herein), to ultimately conform to the length of the amputated limb. Further shown in FIG. 2B are fluid lines (tubes) 36 which are configured to provide/remove fluid (such as air), to the bladders of the sleeve and/or the adjustable pocket, to thereby inflate or deflate the bladders and/or pocket. The deflation/inflation of the bladders provides compression therapy to the circumference of the amputated limb, with which the sleeve is engaged. The inflation of the pocket allows adjusting the height/length of the pocket to the length of the amputated limb, allows the engagement of the pocket with the face of the stump and further allow providing compression therapy to the stump.

Figure 3A:
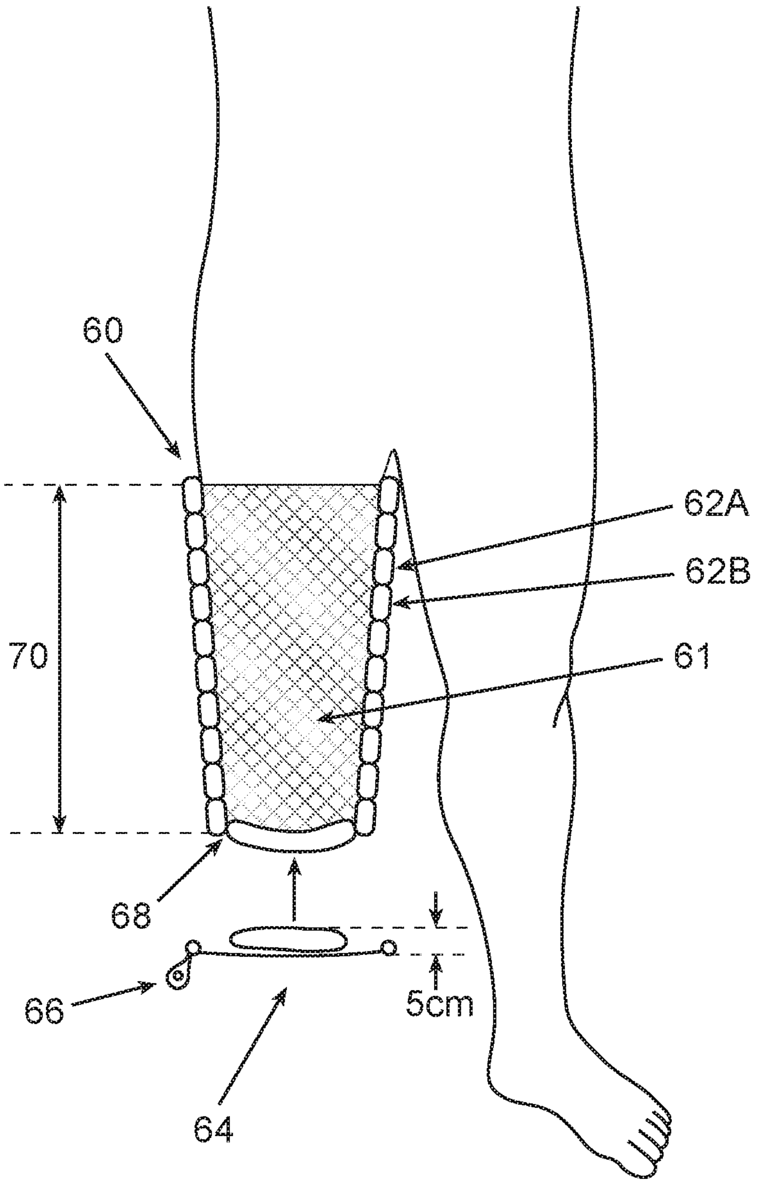
FIG. 3A—a perspective front view of portions of a compression device placed on an amputated limb having a relatively long stump, according to some embodiments.

Reference is now made to FIG. 3A, which is a perspective front view of portions of a compression device placed on an amputated limb having a relatively long stump, according to some embodiments. As shown in FIG. 3A, compression sleeve 60 is placed on an amputated leg 61, such it is surroundingly engageable with the circumference of the limb. The sleeve shown in FIG. 3A is shown in cross section view, whereby bladders thereof are shown (exemplary bladders 62A-B are indicated). As detailed herein, the bladders may be separate or at least partially connected (for example, fluidly connected). In some embodiments, the bladders may be at least partially overlapping. In some embodiments, any number of bladders may be included in a sleeve, such as, for example, 1-20 bladders (for example, 3-14 bladders). Further shown is adjustable compression pocket 64. As detailed herein, the adjustable compression pocket is configured to connect/attach to the sleeve, by suitable means, such as, for example, zipper 66 shown in FIG. 3A. The pocket 64 shown in FIG. 3A is partially inflated, such that the height thereof conforms to the relatively long stump 70. In the example shown in FIG. 3A, the pocket is inflated to a height of 5 cm. The pocket 64 is configured to engage face 68 of the stump, such that the device can provide efficient compression therapy to the amputated limb—both to the circumference thereof (by sleeve 60) and to the stump face (by pocket 64).

Figure 3B:
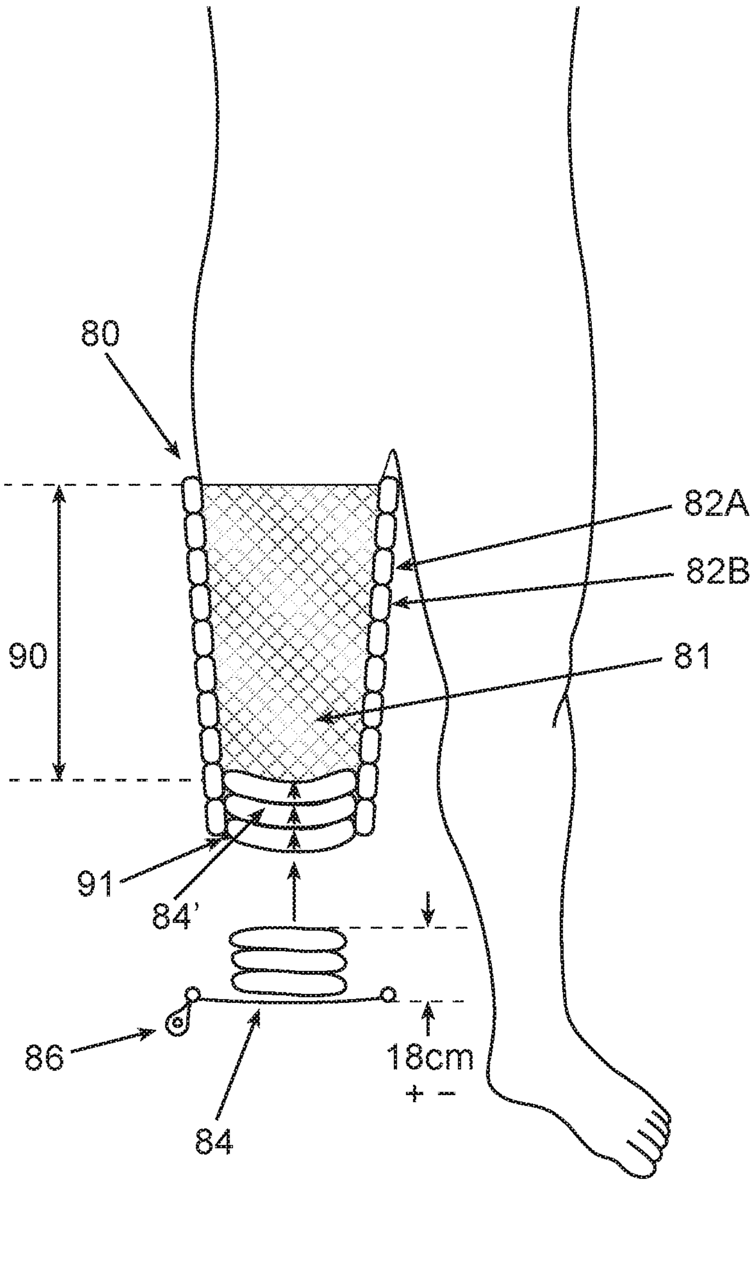

Reference is now made to FIG. 3B, which is a perspective front view of portions of a compression device placed on an amputated limb having a relatively short stump, according to some embodiments. As shown in FIG. 3B, compression sleeve 80 is placed on an amputated leg 81, such it is surroundingly engageable with the circumference of the limb. The sleeve shown in FIG. 3B is shown in cross section view, whereby bladders thereof are shown (exemplary bladders 82A-B are indicated). The bladders may be separate or at least partially connected (for example, fluidly connected). In some embodiments, the bladders may be at least partially overlapping. In some embodiments, any number of bladders may be included in a sleeve, such as, for example, 1-20 bladders (for example, 3-14 bladders). Further shown is adjustable compression pocket 84. As detailed herein, the adjustable compression pocket is configured to connect/attach to the sleeve, by suitable means, such as, for example, zipper 86 shown in FIG. 3B (configured to attach to corresponding zipper 91 of sleeve 80). The pocket 84 shown in FIG. 3A is inflated (open bellow), such that the height thereof conforms to the relatively short stump 90. In the example shown in FIG. 3B, the pocket is inflated to a height of about 15-18 cm. The pocket 84 is configured to engage the face of the stump, such that the device can provide efficient compression therapy to the amputated limb, both to the circumference thereof (by sleeve 80) and to the stump face (by pocket 84). Shown in FIG. 3B inflated pocket 84' engaging the stump face. Thus, by utilizing the adjustable compression pocket, the compression device can accommodate a vast range of stump or amputation lengths and can be used on a variety of subjects.

Figure 4A:
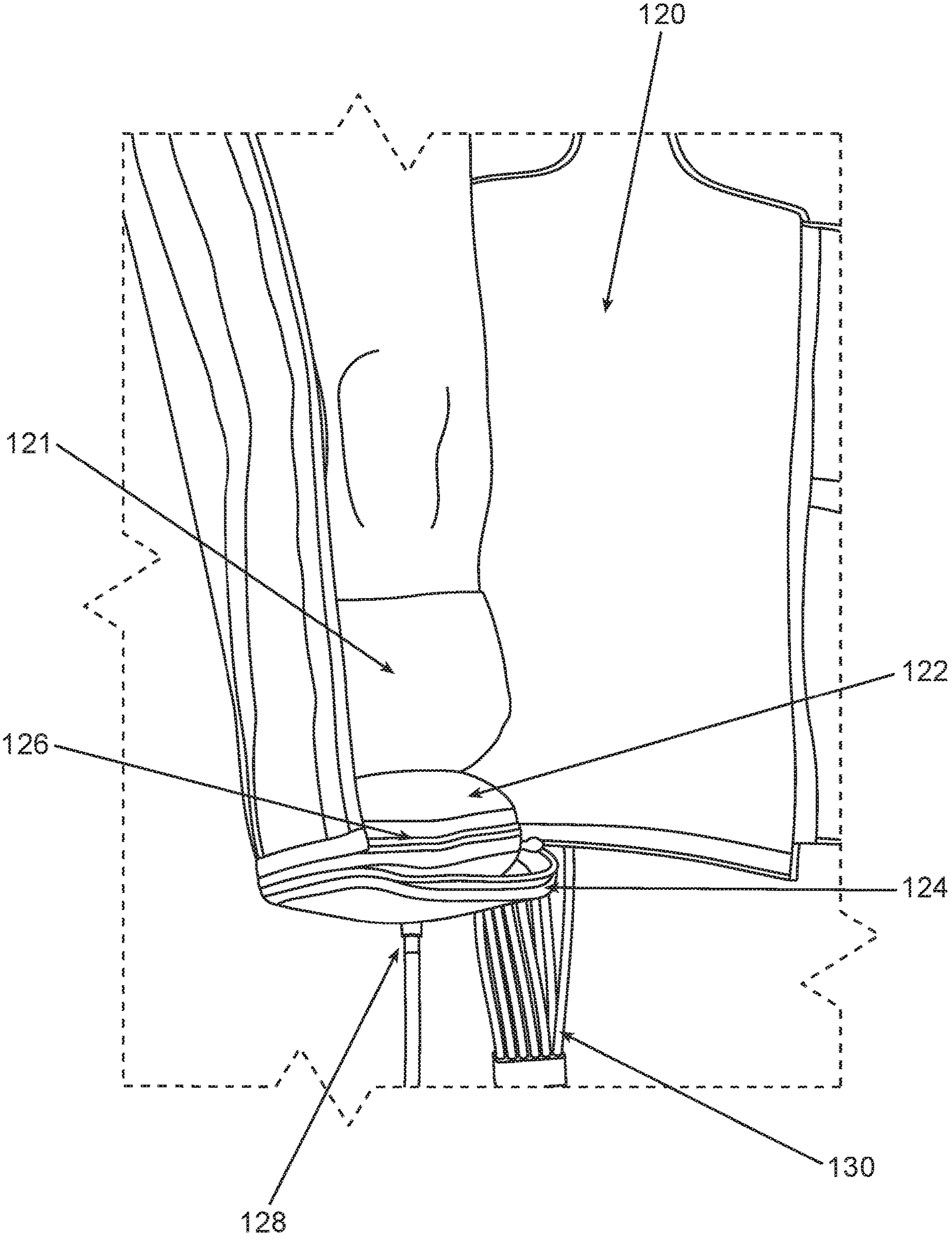
FIG. 4A—a perspective view of a compression device placed on a relatively long amputated limb, according to some embodiments.
Figure 4B:
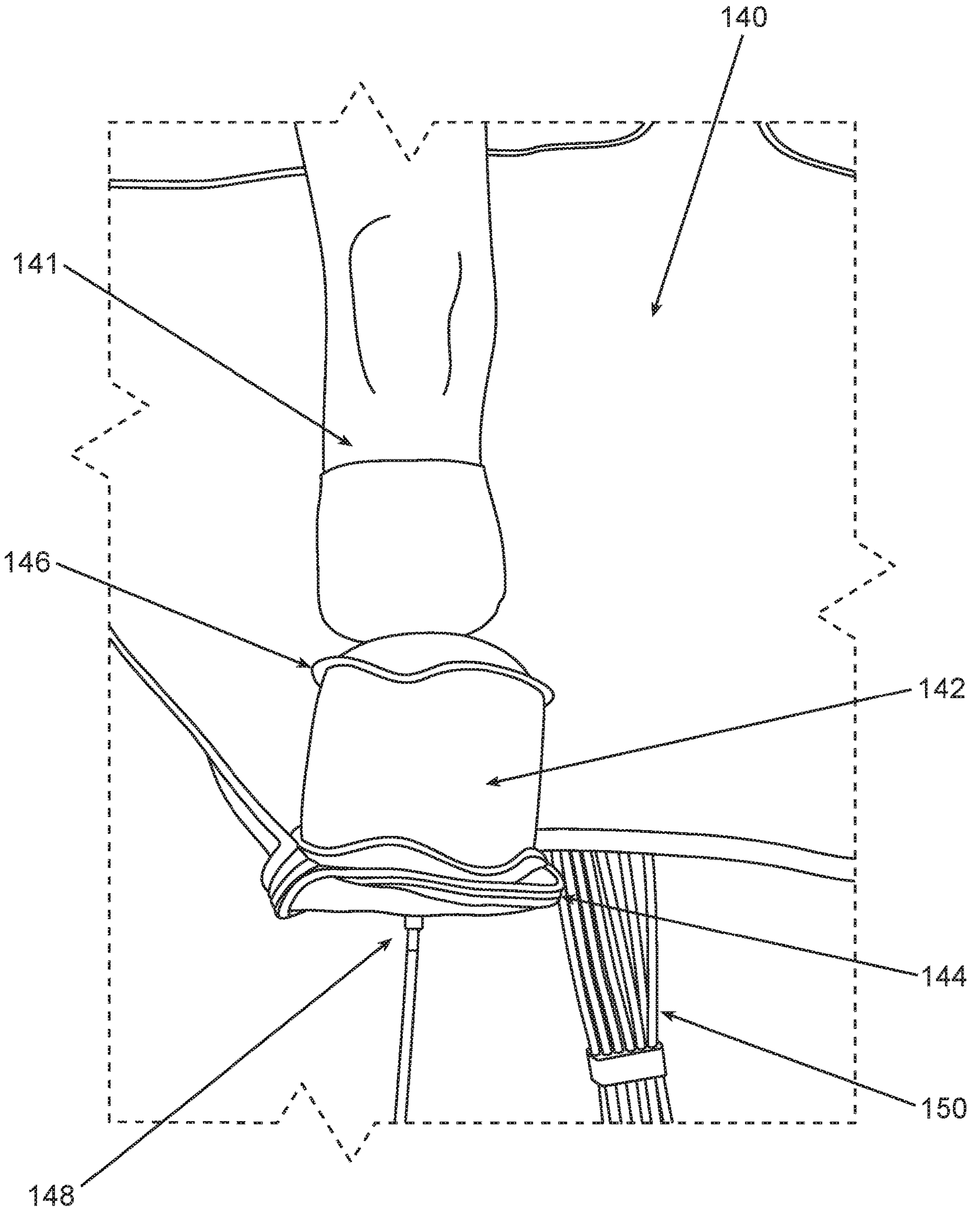

Reference is now made to FIG. 4A, which is a perspective view of a compression device placed on a relatively long amputated limb, according to some embodiments. As shown in FIG. 4A, sleeve 120 of the compression device is placed around the amputated limb 121 (sleeve 120 shown in open state, prior to engaging/surrounding the limb). Further shown is adjustable compression pocket 122, which is at least partially connected to sleeve 120, via, for example, zipper 124. As shown in FIG. 4A, since the length of the amputated leg is relatively long, the pocket is only partially open/inflated. As shown in FIG. 4A, the pocket 122 may include one or more internal securing means which are configured to allow at least partial control over the degree of opening/retracting/inflating of the pocket. For example, as shown in FIG. 4A, pocket 122 may include internal securing mean 126, shown the form of internal zipper, which allows only partial opening of the pocket 122, whereby in a closed state, a first limit is placed on the degree of extraction/inflation/length increase of the pocket. Further shown in FIG. 4A is fluid opening 128 of pocket 122, which is configured to allow inflating/deflating of the pocket by allowing fluid in or out of the pocket. Further shown are fluid lines (tubes) 130 which are configured to provide/remove fluid (such as air), to the bladders of the sleeve and/or to thereby inflate or deflate the bladders. As detailed herein, when the internal securing mean is in open state (for example, the zipper is open), the first length limitation is removed, and the pocket can open/extend/inflate to a larger degree (i.e., larger length/height). This is demonstrated in FIG. 4B, which a perspective view of a compression device placed on a relatively shorter amputated limb, according to some embodiments. As shown in FIG. 4B, sleeve 140 of the compression device is placed around the amputated limb (shown in open state, prior to engaging/surrounding the limb). Further shown is adjustable compression pocket 142, which is at least partially connected to sleeve 140, via, for example, zipper 144. As shown in FIG. 4B, since the length of the amputated leg is relatively long, the pocket is only partially open/inflated. As shown in FIG. 4B, the pocket 142 may include one or more internal securing means which are configured to allow at least partial control over the degree of opening/retracting/inflating of the pocket. For example, as shown in FIG. 4A, pocket 142 may include internal securing mean 146, shown the form of internal zipper, which allows partial opening of the pocket 122, whereby in an open state, shown in FIG. 4B the pocket can open/extend/inflate to a maximal degree (i.e., maximal length/height). Further shown in FIG. 4B is fluid opening 148 of pocket 142, which is configured to allow inflating/deflating of the pocket by allowing fluid in or out of the pocket. Further shown are fluid lines (tubes) 150 which are configured to provide/remove fluid (such as air), to the bladders of the sleeve and/or to thereby inflate or deflate the bladders.

According to some embodiments, the bladders and/or may be constructed of any suitable material. For example, walls of the bladders may be made of such materials as, but not limited to: polyethylene (PE), ethylene-vinyl acetate (EVA), or polyvinyl chloride (PVC), thermoplastic polyurethane (TPU), and the like or combinations thereof According to some embodiments, the ventilation openings of the bladders and/or pocket are configured to allow for the pumping/insertion of fluid (such as, air) into the bladder, and the outflow of fluid (for example by passive or active deflation) from, the bladders, thereby inflating and deflating the bladders and/or pocket. According to some embodiments, the ventilation openings may be in the form of a female connector (for example, in the form of a socketed member), or in the form of a male connector (for example, in the form of tubular spouts). Apart from the fluid connectivity provided by the ventilation openings (fluidly connecting the inside of each of the bladders to the outside), the bladders and/or pocket are fluidly sealed (i.e., airtight). In some embodiments, the ventilation openings may each be connected to a separate fluid tube/hose. In some embodiments, at least some of the ventilation openings may be connected to a common fluid tube/hose.

According to some embodiments, the pressure in each of the bladders and/or pocket may independently be in the range of about 1-150 mmHg. According to some embodiments, the pressure in each of the bladders and/or pocket may independently be in the range of about 10-130 mmHg. According to some embodiments, the pressure in each of the bladders and/or pocket may independently be in the range of about 15-120 mmHg. In some embodiments, each of the bladders and/or pocket may be configured to inflate, deflate or maintain similar or different pressures.

According to some embodiments, the compression device, or portions thereof may be disposable. According to some embodiments, the compression device may washable and reusable.

According to some embodiments, the operation/control of operation of the compression device may be utilized using one or more suitable controllers, allowing the inflation/deflation of the inflatable bladders, in order to provide compression therapy to the subject.

According to some embodiments, the systems and devices disclosed herein may be used in method of applying compression therapy to an amputated limb of a subject in need thereof.

According to some embodiments, the compression therapy system may be utilized continuously or intermittently over any desired period of time beneficial for the subject. In some embodiments, the treatment may be provided is sessions. In some embodiments, the treatment session may be repeated at least once, 2, 4, 6 or more times a day, at any desired time interval therebetween. In some embodiments, each two consecutive treatment sessions may be identical, similar or different therefrom. In some embodiments, the length of a treatment session may be in the range of about 2 minutes to about 6 hours. In some embodiments, the length of a treatment session may be in the range of about 5 minutes to about 1 hour.

According to some embodiments, there is provided a method for providing or applying a compression therapy to an amputated limb of a subject utilizing the advantageous compression device as disclosed herein. According to some embodiments, the compression treatment may include inflating/deflating and/or maintaining pressure in one or more of the bladders and/or the pocket.

According to some embodiments, controlling the pressure in the compression device may include reducing, maintaining, or increasing the pressure in one or more bladders and/or pocket. In some embodiments, the pressure in each bladder may be similar. In some embodiments, the pressure may change individually in each bladder. In some embodiments, the pressure may change concomitantly in all bladders, or at least in some of the bladders.

According to some embodiments, the compression cycles/sessions may be sequential, peristaltic or intermittent, and may be adjusted based on the treatment. The compression cycle may be adjusted according to the order of inflation/deflation of the various bladders/pocket, length of the deflation/inflation, and the like. For example, peristaltic compression may be facilitated by keeping any number of chambers inflated in a given time (for example, one chamber, two chambers or more). In some embodiments, some chambers/bladders may be blocked, kept not inflated during the inflation cycle (i.e., skip chambers) according to the specific medical condition being treated.

According to some embodiments, various compression cycles/sessions may be utilized, in accordance with various parameters, including, for example, but not limited to: the type of limb (for example, arm, leg), characteristics of the subject (age, weight, gender, medical condition, medical history, and the like), the amputation status, amputation location, length of the stump, medical condition to be treated, and the like.

According to some embodiments, the controller unit includes a processing unit or module. According to some embodiments, terms such as “processing”, “computing”, “calculating”, “determining”, “estimating”, “assessing”, “gauging” or the like, may refer to the action and/or processes of a computer or computing system, or similar electronic computing device, that manipulate and/or transform data, represented as physical (e.g. electronic) quantities within the computing system’s registers and/or memories, into other data similarly represented as physical quantities within the computing system’s memories, registers or other such information storage, transmission or display devices. Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus. The processes and displays presented are not inherently related to any particular computer or other apparatus. Various general-purpose systems may be used with programs in accordance with the teachings herein, or it may prove convenient to construct a more specialized apparatus to perform the desired method(s). In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Or processing unit. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

Although steps of methods according to some embodiments may be described in a specific sequence, methods of the invention may comprise some or all of the described steps carried out in a different order. A method of the invention may comprise all of the steps described or only a few of the described steps. No particular step in a disclosed method is to be considered an essential step of that method, unless explicitly specified as such.

Although the invention is described in conjunction with specific embodiments thereof, it is evident that numerous alternatives, modifications and variations that are apparent to those skilled in the art may exist. Accordingly, the invention embraces all such alternatives, modifications and variations that fall within the scope of the appended claims. It is to be understood that the invention is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the invention. Section headings are used herein to ease understanding of the specification and should not be construed as necessarily limiting.

EXAMPLES

Example 1—Application of Compression Therapy to an Amputated Limb

The device for compression therapy is utilized to provide compression therapy to an amputated limb of a subject in need thereof. Various compression cycles may be utilized, in accordance with various parameters, including, for example, but not limited to: the limb, characteristics of the subject (age, weight, gender, medical condition, etc.), the amputation status, amputation location, length of the stump, medical condition to be treated, and the like.

After the compression device is placed and secured to the amputated limb, the compression therapy session/cycle may be initiated.

Listed below are details of three exemplary compression therapy cycles, whereby the order of inflation/deflation of the compression cells (i.e., bladders or compression pocket (also referred to as cell no. 1)) is adjusted according to the treatment session/cycle.

The compression chambers are numbered from 1 at the bottom cell (i.e., adjustable compression pocket) to 2, 3, 4 . . . N (bladders of the compression sleeve) as progressing towards the center of the body.

Compression cycles may be sequential, peristaltic or intermittent as exemplified below:

I. Sequential Compression Cycle:

Inflate #1
Inflate #2
Inflate #3
Inflate #N
...
Deflate all chambers

II. Peristaltic Compression Session:

Inflate #1
Inflate #2
Deflate #1
Inflate #3
Deflate #2
Inflate #4
...

Peristaltic compression is facilitated by keeping/maintaining any number of chambers inflated in given time (1 chamber, 2 chambers or more).

III. Intermittent Inflation Cycle:

Inflate all chambers simultaneously
Deflate all chambers

Chambers may be blocked, kept not inflated during the inflation cycle (skip chambers) according to the specific medical condition being treated.

What is claimed is:

1. An inflatable compression device for providing compression therapy to an amputated limb of a subject, the compression device comprising a compression sleeve configured to be surroundingly engageable with the amputated limb and an adjustable compression pocket configured to engage a stump face of the amputated limb, to thereby provide compression therapy to the stump and at least a portion of the limb, wherein the adjustable compression pocket is in the form of bellows, configured to inflate or deflate, and wherein the adjustable compression pocket is reversibly attached to the compression sleeve by a zipper, wherein the adjustable compression pocket comprises an internal securing means comprising an internal zipper configured, in a closed state, to place a first limit on a degree of extension and inflation of the adjustable compression pocket.

2. The inflatable compression device according to claim 1, wherein the adjustable compression pocket is retractable.

3. The inflatable compression device according to claim 1, wherein a height or length of the adjustable compression pocket is configured to be adjusted.

4. The inflatable compression device according to claim 1, wherein the adjustable compression pocket comprises an external cover, said external cover comprising the internal zipper configured to allow controlling the degree of height or length adjustment of the compression pocket.

5. The inflatable compression device according to claim 1, wherein the compression sleeve comprises one or more bladders configured to be inflated and deflated to thereby provide compression therapy to at least a portion of the limb.

6. The inflatable compression device according to claim 1, wherein the adjustable compression pocket is functionally and/or physically associated with the compression sleeve.

7. The inflatable compression device according to claim 1, wherein the adjustable compression pocket is located substantially horizontally relative to the compression sleeve, such that the adjustable pocket is configured to be engaged or in contact with the stump face and the sleeve is configured to be engaged or in contact with a circumferential portion of the limb.

8. The inflatable compression device according to claim 1, further comprising a harness configured to engage a body part of the subject to attach or secure the compression sleeve and/or the compression pocket to the amputated limb.

9. The inflatable compression device according to claim 8, wherein the harness is adjustable to conform to the body part of the subject.

10. A system for providing compression therapy to an amputated limb of a subject, the system comprising:

the inflatable compression device according to claim 1; and a controller unit configured to control an operation of the inflatable compression device.

11. The system according to claim 10, further comprising a fluid compressor configured to inflate or deflate the compression sleeve and/or the adjustable compression pocket.

12. The system according to claim 10, further comprising: i. one or more valves, configured to control pressure in bladders of the compression sleeve and/or in the adjustable compression pocket; and ii. a user interface and/or a communication unit.

13. The system according to claim 10, configured to inflate, deflate or maintain pressure in the compression sleeve and/or the adjustable compression pocket, in accordance with a compression therapy session.

14. The system according to claim 10, configured to adjust the compression device to a length of the amputated limb.

15. The system according to claim 10, wherein one or more bladders of the compression sleeve and/or the adjustable compression pocket are configured to inflate and/or deflate in synchronization, concomitantly or sequentially.

16. A method for providing a compression therapy to an amputated limb of a subject in need thereof, the method comprising:

placing an adjustable compression device according to claim 1, on the subject, such that the compression sleeve is engageable with at least a portion of the limb;

adjusting a height or length of the adjustable compression pocket to conform to a length of the amputated limb, such that the compression pocket is at least partially in contact with the face of the stump; and controlling the pressure in the inflatable compression device to provide a compression therapy to the amputated limb.

17. The method according to claim 16, wherein controlling the pressure in the inflatable compression device comprises reducing, maintaining, or increasing the pressure in one or more bladders of the compression sleeve and/or the in the adjustable compression pocket.

18. The method according to claim 16, wherein adjusting the height or length of the adjustable compression pocket is facilitated by introduction of fluid into the pocket.

19. The method according to claim 16, wherein the compression therapy is configured to result in one or more of: enhancing blood circulation, reducing lymphatic fluid accumulation in the amputated limb, reducing and controlling post-surgical edema, reducing pain, enhancing wound healing, controling chronic lymphedema, or any combination thereof.

* * * * *